Aug. 13, 1963 G. E. FORD ETAL 3,100,502
PRESSURE RELIEF VALVE
Filed Jan. 29, 1959 7 Sheets-Sheet 7

United States Patent Office 3,100,502
Patented Aug. 13, 1963

3,100,502
PRESSURE RELIEF VALVE
George E. Ford, Rochester, and Charles R. King, East Rochester, N.Y., assignors to Qualitrol Corporation, East Rochester, N.Y., a corporation of New York
Filed Jan. 29, 1959, Ser. No. 789,947
4 Claims. (Cl. 137—491)

The present invention relates to pressure relief valves and, more particularly, to a pressure relief valve for relieving pressure within a pressurized chamber which may rise slowly to a predetermined relatively low value, or which may rise instantaneously to a relatively high value, such as, for instance, in a transformer tank or oil storage tank.

The pressure within a transformer tank builds up most frequently under two general types of conditions. In one case, there may be a slow rise in operating temperatures resulting in a gradual pressure build-up within the tank. In the other case, there may be sudden pressure increase due to arcing or a fault or explosion. The fault or explosion actually occurs near the bottom of the tank, below the oil level, and tremendous liquid pressures can build up as well as gas pressures above the oil within a very short space of time. It is essential, of course, that a pressure relief valve be provided for the transformer tank, and it is desirable that a single relief valve be provided which is equipped to relieve the gradual build-up of pressure to a relatively low maximum safe value and also the sudden rise of pressure to a relatively high value.

Various kinds of such pressure relief valves have been suggested in the past, but none has proved to be entirely satisfactory. In one type of valve, a frangible disk is shattered by the increasing pressure. This type of valve has the disadvantage that it is difficult to ascertain at exactly what pressure the frangible disk will fracture. Furthermore, when the frangible disk does fracture, the transformer must be taken out of service to clean away the disk fragments and to replace the disk.

In another type of valve, a frangible disk is fractured by a mechanical device such as a spring loaded hammer or wedge. While more easily calibrated, this type of valve had similar disadvantages in that the transformer had to be taken out of operation to clean away the disk fragments, to replace the disk and to recock and assemble the mechanical fracturing device. Both of these types have the additional disadvantage that on sudden pressure rises due to serious faults or explosions, the operation lags, so that the frangible disk does not shatter at the calibrated pressure. Since the build-up of pressure is rapid, and may arrive at a level large enough to rupture the tank before relief occurs, an extremely dangerous situation results.

In another type of mechanical relief device, a plate is sealed against a gasketed opening by mechanical linkages, cams, triggers, or the like. These devices function fairly well at the required pressure, but have the disadvantage that they do not reseal themselves, so that a maintenance crew has to investigate the installation and re-trigger the device before it is ready to operate again. Another disadvantage is that quite a bit of the mechanism extends within the transformer, and therefore reduces the discharge opening considerably and presents an obstacle to the smooth flow of gasses out through the discharge openings. Again, when there is a sudden rise in the pressure, the lag of operation may result in a dangerous situation. Such devices have a relatively large mass, and considerable force is required to get them in motion and also great strength has to be built into the unit to stop that much force once the unit does operate.

Another disadvantage of many of the prior art devices is that they tend to leak inasmuch as the gradually increasing pressure is always trying to open the sealing valve, particularly at pressures near the calibrated pressures.

An object of the invention is to provide a generally improved and more satisfactory relief pressure valve for an enclosed tank or chamber.

Another object of the invention is to provide a new and improved pressure relief valve for relieving pressure within an enclosed tank or the like which builds up gradually to a relatively low predetermined pressure, or which rises suddenly to a relatively large pressure, such as might be caused, for instance, by an explosion in the tank.

Yet another object of the invention is the provision of a new and improved pressure relief valve for releiving pressure within an enclosed tank or the like, at one predetermined pressure when the pressure builds up gradually to a calibrated value, or at a still lower predetermined pressure when the pressure increases suddenly, thus enabling the quick release of an explosive-type pressure rise much quicker than would be the case if the mechanism awaited a build-up to the pressure at which the mechanism operates when there is a slow increase.

A further object of this invention is to provide a new and improved pressure relief valve which reseats and reseals itself automatically after the valve has opened to relieve pressure within an enclosed tank or the like.

A still further object is to provide a new and improved pressure relief valve which seals itself more tightly as pressure within an enclosed tank or the like increases to a predetermined value for which the valve is calibrated.

Another object of the invention is to provide a new and improved pressure relief valve which seals more tightly as the pressure within an enclosed tank or the like increases slowly, and continues to seal more tightly until a calibrated release pressure is reached at which time it opens to relieve the pressure instantly, but which opens instantly without waiting for the calibrated pressure to be reached when there is a sudden pressure rise in the tank such as might be caused, for instance, by an explosion within the tank.

Yet another object is the provision of a new and improved pressure relief valve of the type described in the other objects which is relatively light weight and which may be manufactured inexpensively.

These and other desirable objects may be attained in the manner disclosed as an illustrative embodiment of the invention in the following description and in the accompanying drawings forming a part hereof, in which.

The same reference numerals throughout the several views indicate the same parts.

The pressure relief valve according to the present invention may be used for example on a transformer tank, although it is to be understood that its use is not limited to this one application, and the valve has general utility wherever its structure or operation adapts it to be used. The description will therefore proceed with regard to its application to a transformer tank, merely as an illustrative example. In a transformer tank, as is well known, the electrical apparatus is immersed in a bath of oil or the like, and the space between the top of the oil bath and top of the tank is filled with gasses or vapors. The pressure relief valve herein described is mounted toward the top of the tank above the upper surface of the oil bath, and is preferably mounted in the top or cover of the tank for relieving excess pressure of these gasses or vapors.

The pressure of the gasses at the top of the transformer tank fluctuates in response to changes in internal and external conditions, and increases above a safe level because of two general types of cases. In one case, there may be an increase in the operating temperature of the transformer, or of the temperature of the air surrounding the transformer tank, resulting in a gradual increase in the pressure of the gasses until an unsafe level is reached. In the other case, there may be an arcing or fault or explosion of the transformer apparatus resulting in a sudden increase of the pressure within the tank to a relatively high level. The fault or explosion actually occurs near the bottom of the tank, below the oil level, and tremendous liquid pressures build up as well as gas pressures above the oil within a very short space of time. It has been found that the pressure relief in this latter case should occur within one-half of a current cycle in order to prevent the development of pressures large enough to puncture the tank and otherwise alleviate this dangerous situation; in other words, within $\frac{1}{120}$ of a second, if 60 cycle current is flowing.

Figure 1:
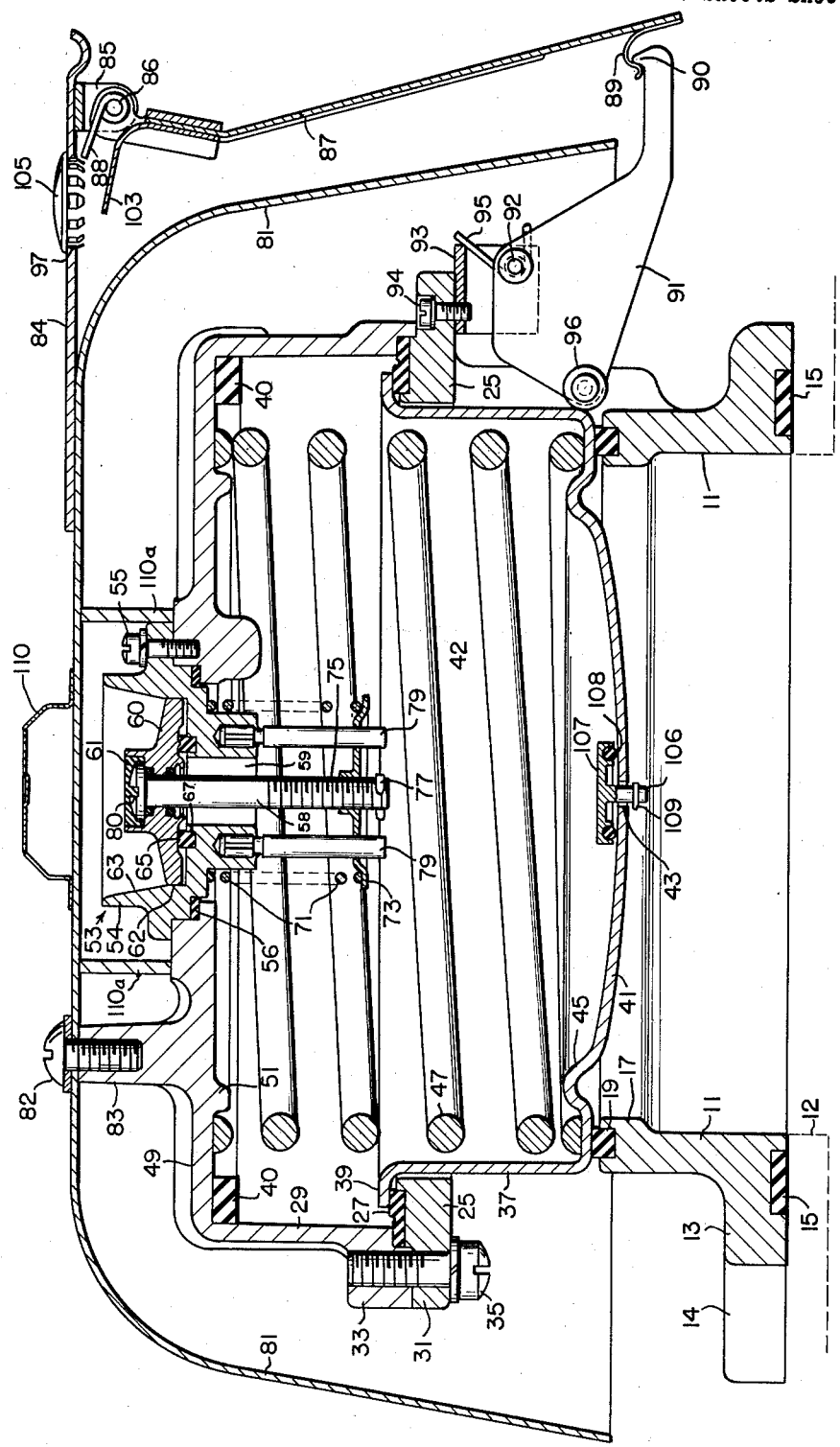
FIG. 1 is a cross sectional view of a pressure relief valve according to a preferred embodiment of the present invention, the valve being shown in its closed position and mounted on a transformer tank, a fragmentary portion of which is shown in dashed lines.
Figure 2:
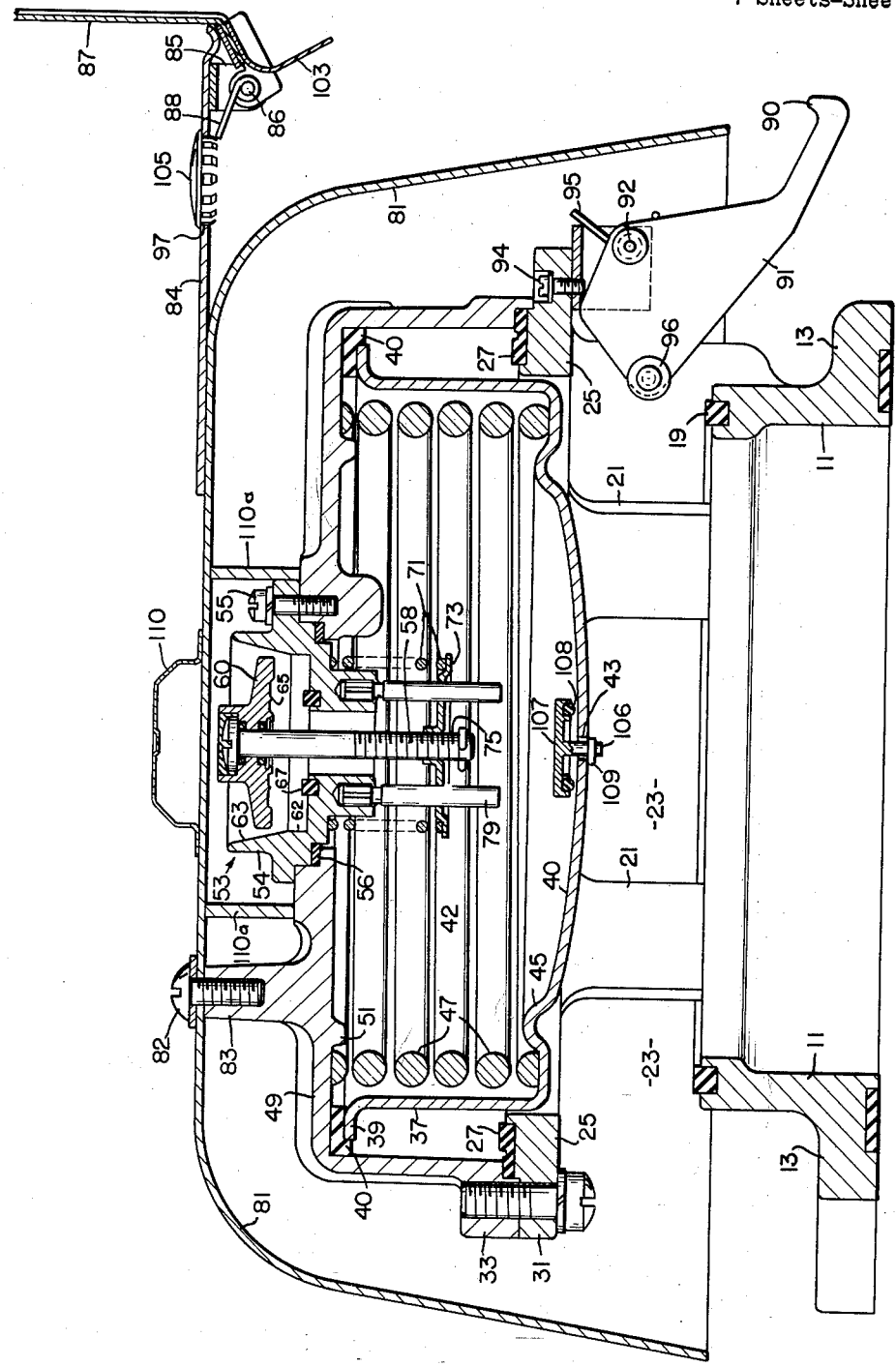
FIG. 2 is a view similar to FIG. 1 showing the valve in its open position for relieving a sudden increase of pressure.

In FIGS. 1 and 2 is shown a tubular body having a lower portion 11, preferably circular in cross section, which is mounted in surrounding relation to a circular aperture or opening 12 in the tank to which the device is attached, a fragmentary portion of which is shown in dashed lines. The lower end of the lower housing 11 is desirably provided with a laterally extending mounting flange 13 having appropriate slots 14 for receiving bolts or other clamping means for rigidly mounting the valve on the outside of the tank. To provide a pressure tight mounting for the lower housing 11, a gasket 15 is desirably embedded in its lower edge bearing down on the surface of the tank. Intermediate of the height of the housing 11 there is a level ring 17 in which is embedded a circular gasket 19. Offset radially outwardly from the ring 17 and extending axially therefrom are a plurality of support bars 21 circumferentially spaced from one another to provide a pressure relief opening 23 between each set of adjacent bars. At the top of the bars 21 is a ring 25 having a flange portion which extends radially outwardly beyond the bars 21. In the upper level surface of the ring 25 is mounted a circular gasket 27. The housing portion 11, flange 13, ring 17, supporting bars or arms 21, and the ring or flange 25, 31 are preferably all formed integrally with each other, conveniently in the form of a metallic casting.

An upper housing or cap 29 is mounted on the ring 25. The cap 29 has preferably cylindrical side walls the lower ends of which clamp over the outer edge of the gasket 27 to secure the gasket more firmly in place, and to make a leak-proof between the upper and lower housing portions. At a plurality of circumferentially spaced points, the ring 25 has outwardly extending flanges 31 and the lower end of the cap 29 has outwardly extending flanges 33. Appropriate fasteners such as the screws 35 unite the members 31 and 33. The cap 29 is thus securely mounted to the lower housing 11, the outer edge of the gasket 27 providing a pressure tight joint.

Loosely slidably mounted within the support bars 21 for axial movement within the lower housing 11 and the cap 29 is a cup member 37. At the upper end of the preferably circular walls of the cup 37 is an outwardly extending level flange 39 which, when the cup 37 is in its lower or sealing position, that is when the valve is closed, abuts the gasket 27 to provide a pressure tight seal. The outer edge of the bottom 41 of the cup 37 rests on the gasket 19 when the cup is in its sealing position, thus closing or sealing off the pressure relief openings 23. The outer surface of the cup 37 is preferably coated with a plastic gasket material, such as "Teflon," manufactured by E. I. du Pont de Nemours & Co. The bottom 41 of the cup 37 has a central bleed port aperture 43 for establishing restricted communication between the valve chamber 42 formed by the cap 29 and the cup 37, on the one hand, and the interior of the tank to which the device is attached, on the other hand.

Toward the outer edge of the bottom 41 of the cup 37 there is an inwardly extending circular rib 45 about which is mounted a spring 47. The spring 47 extends between the bottom 41 of the cup and top 49 of the cap or upper housing 29. A downwardly extending circular rib 51 is desirably mounted on the inner surface of the cap 29 for locating the upper end of the spring 47, the projections 45 and 51 being in alinement. The spring 47, of course, urges the cup 37 against the gaskets 19 and 27, the pressure or force of the spring being relatively light. The spacing of the gaskets 19 and 27 is such, with relation to the size of the cup 37, that when the cup moves in a closing direction toward the gaskets, it will contact first with the gasket 19 and seal at this point, and then will make sealing contact with the gasket 27 only after the gasket 19 has been slightly compressed.

Mounted in the top 49 of the cap 29, preferably centrally of the axis of the valve chamber 42, is a smaller auxiliary valve 53 for relieving pressures which gradually increase to a relatively low predetermined safe value. This auxiliary valve 53 in its preferred form includes a valve body 54 mounted in a circular opening in the wall 49 and maintained in tightly sealed relation thereto by circumferentially spaced screws 55 which hold the valve body tight against the sealing gasket 56. A valve stem or piston rod 58 passes vertically through a central aperture 59 in the valve body, of considerably larger diameter than the valve stem so as to provide a free passageway around the valve stem. The upper end of the stem is fixed to a piston valve 60 tightly sealed to the stem where it passes through the valve, by means of sealing rings 61, so that pressure cannot escape at this point.

Above the aperture 59, the internal diameter of the valve body is considerably greater, and the lower part of this larger diameter portion has straight cylindrical side walls as seen at 62, while above the cylindrical part the walls flare or taper upwardly and outwardly as at 63. When the valve 60 is in its normal closed position (FIG. 1) the peripheral edges of the valve fit snugly but easily slidably in the cylindrical portion 62 of the body 54, and a sharp rib 65, triangular in cross section and circular in plan, formed on the bottom face of the valve 60 digs into the top face of a sealing gasket 67 and thus maintains a pressure-tight seal between the valve body 54 and the valve piston 60. The sealing rib 65 has about one-half the diameter of the cylindrical portion 62.

When the piston 60 is moved upwardly within the body 54, pressure may escape all around the periphery of the piston 60 as seen in FIG. 2, on account of the taper or flare of the part 63. To bias the piston 60 to its lower or closed position, a spring 71 is provided, which reacts against the bottom of the valve body 54 at its upper end, and reacts at its lower end against a retainer plate 73 adjustably mounted on the lower end of the piston rod 58, as by means of screw threads 75 on the piston rod, engaging corresponding screw threads in a central aperture of the plate or disk 73. A stop or cotter pin 77 projecting radially from the rod 58 near the lower end prevents the disk from being unscrewed too far. To guide the motion of the spring 71 and disk 73 in an axial direction, and also to hold the disk 73 against turning when the piston rod 58 is turned to adjust the spring force when calibrating the valve, two guide rods 79 extend downwardly from the body 54 parallel to the rod 58 and go through apertures in the retainer plate 73. The guide rods 79 are on opposite sides of the rod 58, and their upper ends are firmly staked in bosses formed on the lower face of the body 54.

The upper end of the piston rod 58 has an enlarged head provided with a screwdriver slot 80 into which a screwdriver may be inserted (when the below-mentioned cover 81 is removed, of course) to turn the piston 60 and piston rod 58 relative to the disk 73 which is kept from turning by the rods 79, thus causing the disk to travel on the screw threads 75 to adjust the force exerted by the spring 71.

A cover or umbrella 81 is desirable provided to protect the auxiliary valve 53 from the elements. In its preferred form, the umbrella 81 encases also the cap 29 and the upper portion of the lower housing 11 and is removably held by screws 82 screwed into the upper ends of struts or posts 83 rising from the cap 29. The umbrella 81 is supported free of the valve so as not to obstruct the passage of gasses to the surrounding atmosphere, when the valve 53 opens.

Welded to the top surface of the cover 81 is a sheet metal arm 84 extending laterally and having on its under face, near its outer end, a bracket 85 carrying a pivot 86 on which is pivotally mounted a visible signal member or flag 87 urged by a spring 88 toward an upstanding position as partially seen in FIG. 2. When the flag is manually swung down to the normal position shown in FIG. 1, a somewhat resilient lug 89 on the flag engages behind and is retained by a latch nose 90 on a latch lever 91 pivoted at 92 to a bracket 93 fastened to the flange 25 by a screw 94. A spring 95 tends to swing the latch lever 91 clockwise on its pivot 92, but such movement is prevented by a roller 96 on the heel of the latch lever engaging the main valve cup 37, 41 when the later is in its normal closed position as in FIG. 1.

When the valve opens because of a rise in pressure, as further described below, the valve cup 37, 41 moves upwardly away from the path of the roller 96, so that the spring 95 may swing the latch 91 to the position seen in FIG. 2, thereby releasing the flag 87 so that its spring 88 may move it to the upstanding position. Although the relief valve mechanism resets itself autmotically when pressure conditions return to normal, the signal flag is not reset automatically, but remains in attention-attracting position until reset by hand. Thus an attendant, making periodic inspections of the apparatus, is apprized of the fact that the relief valve had operated or "blown" since his last visit, even though conditions might again be normal at the moment.

The arm 84 is quite wide in a direction tangentially of the cover 81, so as to act as a roof giving adequate protection to the moving parts 87—91 against sheet or snow. Thus the signal flag operates quite reliably in spite of severe sleet or snow conditions.

In addition to having the visible signal flag 87 operate when the relief valve opens, it is frequently desired also to have an indication given at a remote point. To this end, the arm 84 is provided with an aperture 97 (FIGS. 1 and 2) through which may extend a hollow bushing 98 (FIG. 8) projecting downwardly from the bottom face of an electric switch housing 99 fixed in any suitable manner to the top surface of the arm 84. Within this housing 99 is a miniature electric switch 100 of the plunger type with normally closed contacts opened when the switch plunger is pressed inwardly. An external plunger 101 movable axially in the bushing 98 is urged downwardly by a spring 102, its motion in that direction being suitably limited. The upper end of the external plunger 101 engages the operating plunger of the switch 100, and its lower end engages a flange 103 on the flag 87. When the flag is in the normal "down" position (FIG. 1), the flange 103 holds the plunger 101 up against the force of its spring 102, thereby maintaining the switch 100 open. When the pressure relief valve opens, the movement of the flag to the upstanding position of FIG. 2 withdraws the flange 103 from the plunger 101 so that the spring 102 moves this plunger downwardly, thereby allowing the operating plunger of the switch 100 to move downwardly to close the switch contacts. The circuit is accordingly completed through the circuit wires 104 leading to any desired remote point, to give an indication at that remote point. Of course a three-wire two-circuit plunger switch 100 may be used if desired, a first circuit being open and a second circuit closed when the external plunger 101 and the switch plunger itself are in their lower positions, the first circuit being closed and the second circuit being open when the plungers are in their upper positions.

If remote indications through an electric circuit are not wanted, the switch housing 99 is omitted entirely when assembling the device, and the aperture 97 in the arm 84 is closed by a conventional plug 105 (of the familiar kind used in closing unwanted holes in electric junction boxes, etc.) as seen in FIGS. 1 and 2, to prevent rain from passing through the aperture 97 and possibly freezing on the flag latch parts.

The bleed port 43 in the bottom wall 41 of the cup member 37 preferably receives loosely a valve stem 106 of a valve head 107 carrying a sealing ring 108 normally resting loosely on the upper face of the bottom wall 41. The valve may move upwardly to a limited extent determined by a cotter pin or other stop pin 109 extending through the stem 106. The stem is quite loose in the hole 43, allowing ample space for slowly rising pressure within the tank to seep through the hole 43, raise the valve 107, 108, and enter the main chamber 42. However, if the pressure within the tank falls below that in the main chamber 42 (as may sometimes happen during certain kinds of tests, when a partial vacuum may be produced within the tank to which the relief valve is attached), then the valve 107, 108 becomes tightly seated and seals the bleed port 43, to prevent formation of a partial vacuum within the chamber 42, which might cause undesired opening of the relief valve 37.

While on the subject of tests, it may be mentioned that when performing certain kinds of tests on the apparatus, it is desirable to keep the piston valve 60 fully closed. For this purpose, an inverted cup-shaped member 110 of somewhat resilient sheet metal is welded to the top surface of the cover 81, directly in alinement with the valve 60, as seen in FIG. 1. When tests of the kind just mentioned are to be made, the screws 82 of the cover are removed, the cover is turned upside down, and the screws 82 are replaced, thus holding the cover 81 tightly in an inverted position. In this position, the cup member 110 is of just the right size to make firm contact with the top of the valve piston 60, holding this piston valve tightly closed. The desired tests may then be performed. When they are concluded, the cover 81 is replaced in its normal rightside-up position.

It is desirable to place a fine mesh screen or other suitable filter 110a, of cylindrical shape, in surrounding relation to the piston valve assembly, between the wall 49 and the cover 81, as shown in FIGS. 1 and 2. This prevents grit and dust from being carried up under the cover 81 and into the piston valve assembly, by gusts of wind.

It is also desirable to provide a resilient buffer ring 40 on the bottom surface of the top wall 49 of the cap member 29. This ring 40 is of rubber or rubber-like material, and acts as a bumper to contact with the flange 39 to absorb the shock of sudden upward movement of the cup 37, 41 when it "blows" to the open position seen in FIG. 2.

FIGS. 1 and 2 of the drawings originally filed with this application constitute substantially full-size drawings of a satisfactory workable embodiment of this invention, so that typical dimensions of a workable embodiment may be ascertained by examining the sizes of the parts as shown in original FIGS. 1 and 2.

Figure 8:
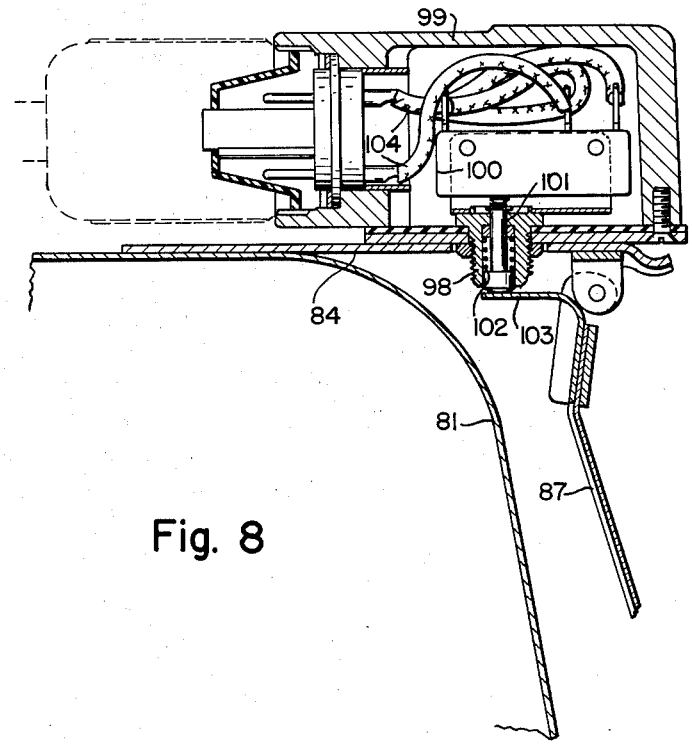
FIG. 8 is a section similar to the upper right portion of FIG. 1, showing an electric switch which may be used to control a signal at a remote point.

In the operation of the preferred form of FIGS. 1, 2, and 8, the valve is assembled on the transformer tank with the cup 37 in its lower sealed position in sealing engagement with the gaskets 19 and 27. The auxiliary valve 53 is likewise in its closed position with the piston 60 abutting the gasket 67. In this closed position it is to be noted that the valve chamber 42 is sealed to the outside atmosphere with the exception of the bleed port 43 in the cup 37 which is in communication with the interior of the tank. The tension of the spring 71 is adjusted by turning the piston 60 and piston rod 58 as above mentioned, so that the piston 60 "blows" or moves to its open position at the desired pressure.

The pressure of the gasses or vapors in the tank are transmitted to the interior of the valve through the bleed port 43. As the pressure increases gradually, the sealing force of the cup 37 on the gaskets 19 and 27 increase a proportionate amount, since the interior of the valve and the tank are at the same pressure. In the illustrated form of this construction, the area of the upper face of the cup 37, 39, 41, on which the pressure within the chamber 42 acts in a sealing direction, is larger than the area of the bottom space within the gasket 19, on which latter area the pressure within the tank acts in an unsealing direction, but this is not necessarily so. Of course the pressure within the tank and the pressure within the chamber 42 is always the same so long as the change in pressure is sufficiently slow to be accommodated by the bleed port 43. Therefore, due to the difference in area above mentioned, the sealing pressure acting to prevent leakage at the gaskets 19 and 27 will increase as the tank pressure increases, under slow-rise conditions. This results in very efficient sealing against undesirable escape of pressure.

The main spring 47 has very little force, and is overcome when the difference in pressure within the tank and within the chamber 42 reaches a predetermined low amount, e.g., 2 pounds per square inch. However, even this slight difference in pressure does not exist during normal pressure rise within acceptable limits, because the bleed port 43 equalizes the pressure. Therefore, during slow-rise conditions, the cup 37 remains in tightly sealed relation to the gaskets 19 and 27 until the rise in pressure reaches the limit at which the piston 60 is designed to open.

Still considering slow-rise conditions, the rising pressure in the chamber 42 acts upwardly on the small area of the piston 60 which is within the gasket 67. When the calibrated safe pressure for gradual increase or slow rise (e.g., 10 pounds per square inch) is reached, the pressure on this limited area of the piston 60 lifts the piston against the downward force of the spring 71. As soon as the piston begins to lift from the gasket 67, the pressure can act on the entire lower face of the piston 60 instead of just the area thereof encircled by the gasket 67. Since the piston itself has about twice the diameter of the gasket, the whole area of the lower face of the piston is about four times the area within the gasket. Therefore, the opening action is extremely rapid, once it starts, for as soon as the upward motion of the piston begins, it is immediately subjected to about four times the upward force which was required to start the upward movement.

As the upward motion of the piston 60 continues, the margin of the piston rises into the tapered or enlarged part 63 of the valve body. This immediately allows escape of the accumulated pressure in the chamber 42. The outflow of pressure through the open piston 60 is much faster than the pressure in the chamber 42 can be replenished through the restricted bleed port 43; therefore there is an immediate drop in pressure within the chamber 42, substantially to atmospheric pressure, whereas the pressure within the tank remains at the pressure (e.g., 10 pounds per square inch) which caused the piston 60 to move upward to its open position. Hence there is immediately established a very considerable pressure difference on opposite faces of the cup 41, much more than can be resisted by the light spring 47. This differential pressure, acting upwardly on the bottom 41 of the cup 37, moves the cup upwardly against the light downward force of the spring 47, unseating the cup from both of the gaskets 19 and 27 and allowing rapid outflow of pressure all around the gasket 19 through the relatively large lateral openings 23, as apparent from FIG. 2. The contact with the gasket 27 opens slightly before the contact with the gasket 19, thus assisting quick escape of pressure from the chamber 42 and promoting quicker upward movement of the cup 37, 39, 41. Also the latch 91 is released and the flag 87 comes up.

The tank is thus quickly relieved of the excess pressure. When the pressure within the tank is reduced to a low figure (e.g., about 2 pounds per square inch) well within safe limits, the cup 37 moves down to its initial or normal position, under the influence of the spring 47, and again becomes seated in sealing relation to the gaskets 19 and 27, compressing the former enough to enable seating against the latter. The piston 60 likewise moves down to its seated position, under the influence of the spring 71. The valve thus reseals the tank automatically after relieving the excess pressure, and requires no manual tripping or reconditioning to make it ready for the next actuation when needed.

On a sudden rise of the pressure in the tank, such as caused by an explosion within the tank or by the arcing of faulty electrical parts, the action of the valve is somewhat different than the slow-rise action above described, and the opening of the valve occurs at a much lower pressure than under slow-rise conditions. When there is a fast rise, the bleed port 43 cannot keep the pressure in the chamber 42 at the same value as the pressure in the tank, so that there is an immediate differential pressure acting on the bottom 41 of the cup 37 even though the piston 60 has not opened. Because of this pressure differential, the cup 37 is moved axially off of the gaskets 19 and 27 against the force of the spring 47, first opening at the gasket 27 to reduce pressure in the chamber 42, and then opening at the gasket 19. When the cup 37 has moved to its upper position, the pressure is relieved by escaping outwardly through the openings 23 between the support bars 21 of the lower housing 11, just as was the case when the cup 37 moved upwardly to its open position under conditions of slow pressure rise, after the opening of the piston 60. The difference is that under conditions of fast pressure rise, the cup 37 opens initially because of the pressure differential created by the fast rise of pressure in the tank and by the inability of the restricted bleed port 43 to allow the pressure in the chamber 42 to rise fast enough to equalize the differential, or possibly (in some cases) because of the existence of an explosive shock wave impinging upon the bottom 41 of the cup 37 and lifting the cup with sufficient force to overcome the spring 47 and create an opening at the gasket 27. Under slow pressure rise conditions, however, the pressure above and below the cup 37 is the same (due to the bleed port 43), so that the differential pressure necessary to raise the cup 37 does not exist until the piston valve 60 opens, which has the effect of reducing the pressure in the chamber 42 so as to create a pressure differential sufficient to raise the cup 37.

For varying the conditions under which the relief valve will operate, the member 107 may be replaced by another member 107 having a stem 106 of different diameter, thereby varying the effective flow area of the bleed port 43.

In addition to the coating of the outer face of the cup 37 with "Teflon" (as already mentioned) the bottom and outside faces of the piston 60 are also coated with the same material. These coatings help to insure smooth operation and to prevent sticking of the movable parts to the gaskets, even after long periods of inactivity. Thus the valve will open reliably at the desired predetermined pressures of slow rise and fast rise, respectively, even after long use or long inactivity, without any sticking which might otherwise impede the opening and increase the pressures required to open the valve.

The pressure relief valve herein described, it is to be noted, has the advantages of completely and automatically self reclosing and resealing, sealing itself more tightly as pressure within the tank increases, and opens instantly without waiting for the calibrated pressure of the auxiliary valve 53 to be reached when there is a sudden pressure rise or fault.

Figure 3:
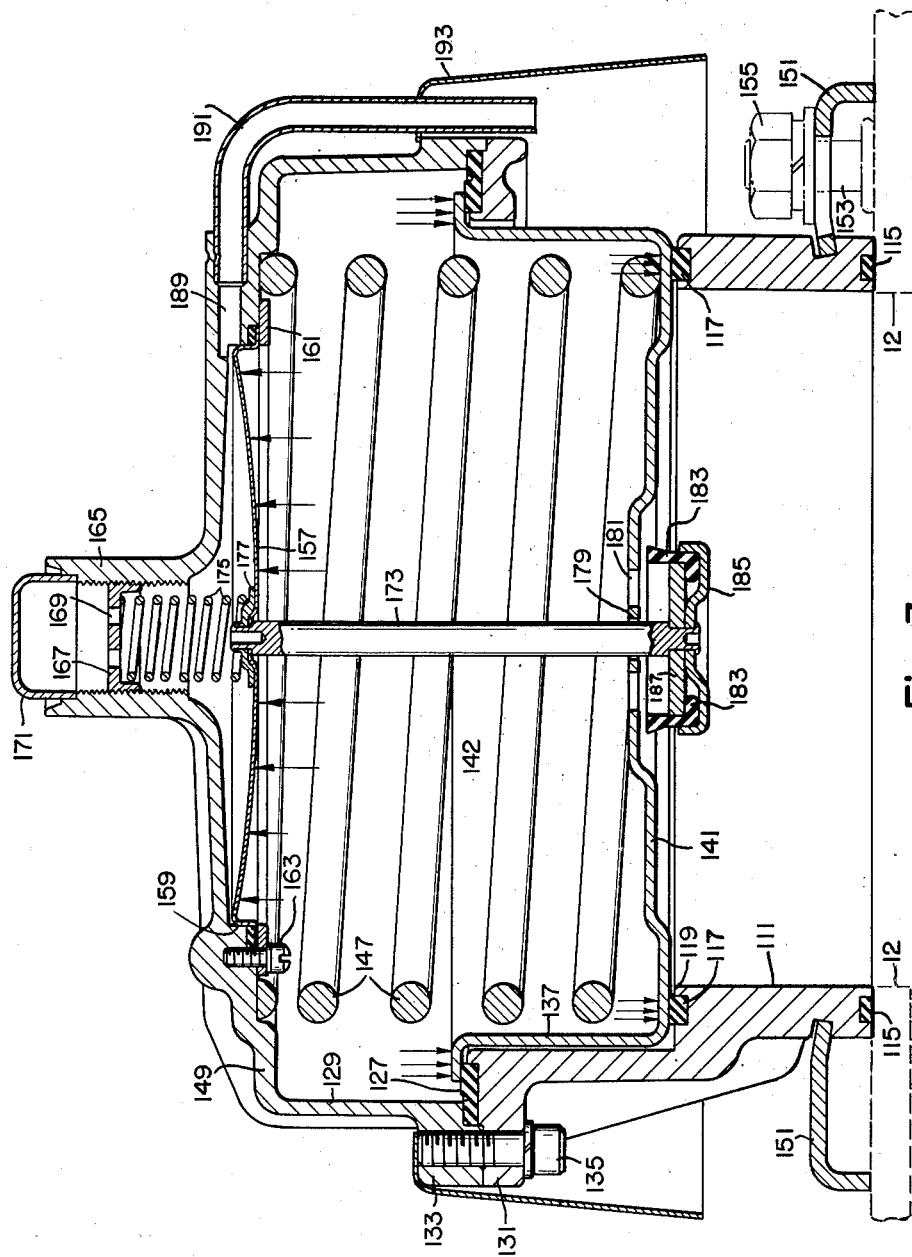
FIG. 3 is a cross sectional view of a modified form of the invention showing the valve in its closed position.
Figure 4:
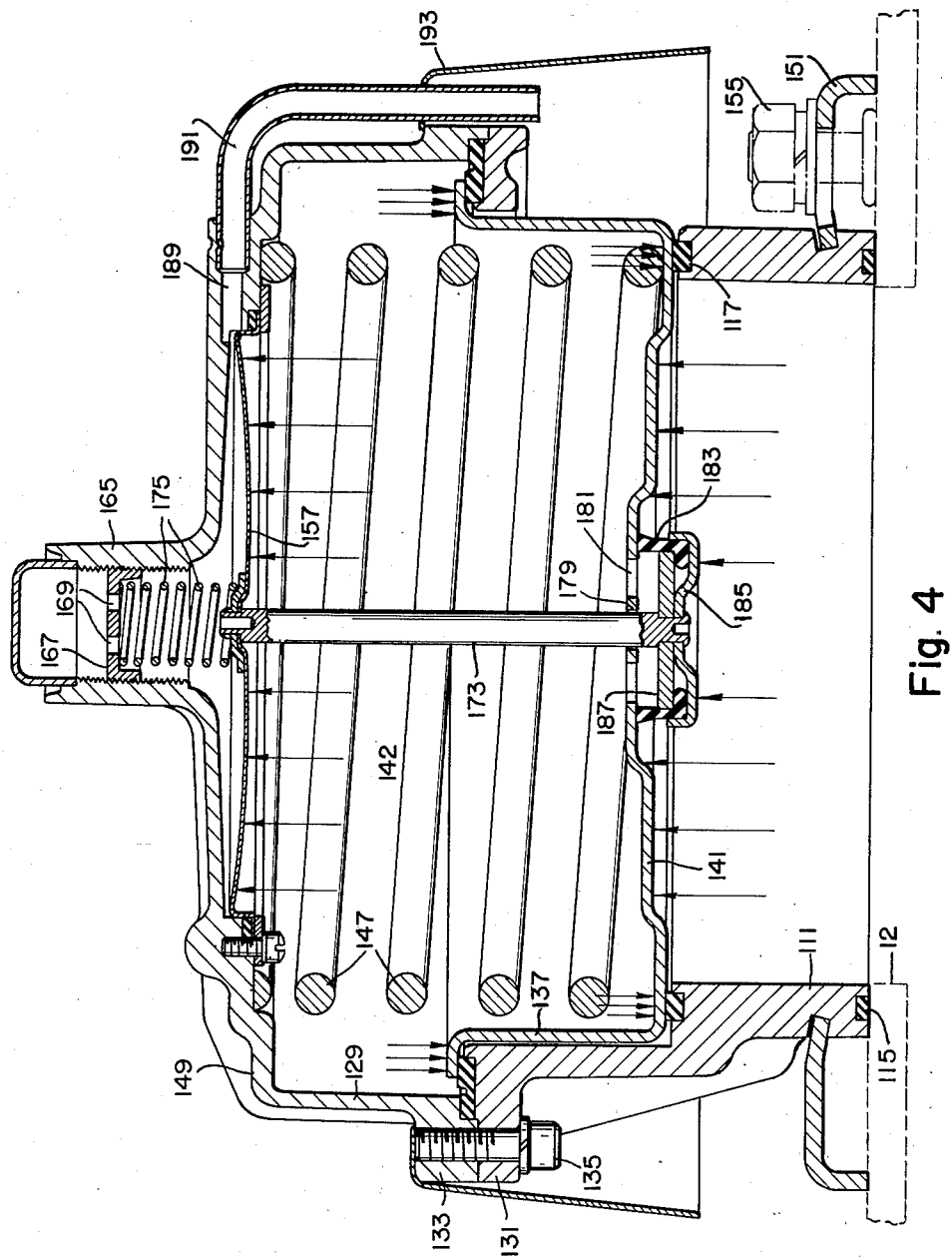
FIG. 4 is a view similar to FIG. 3 showing the valve in its position preparatory to opening.
Figure 5:
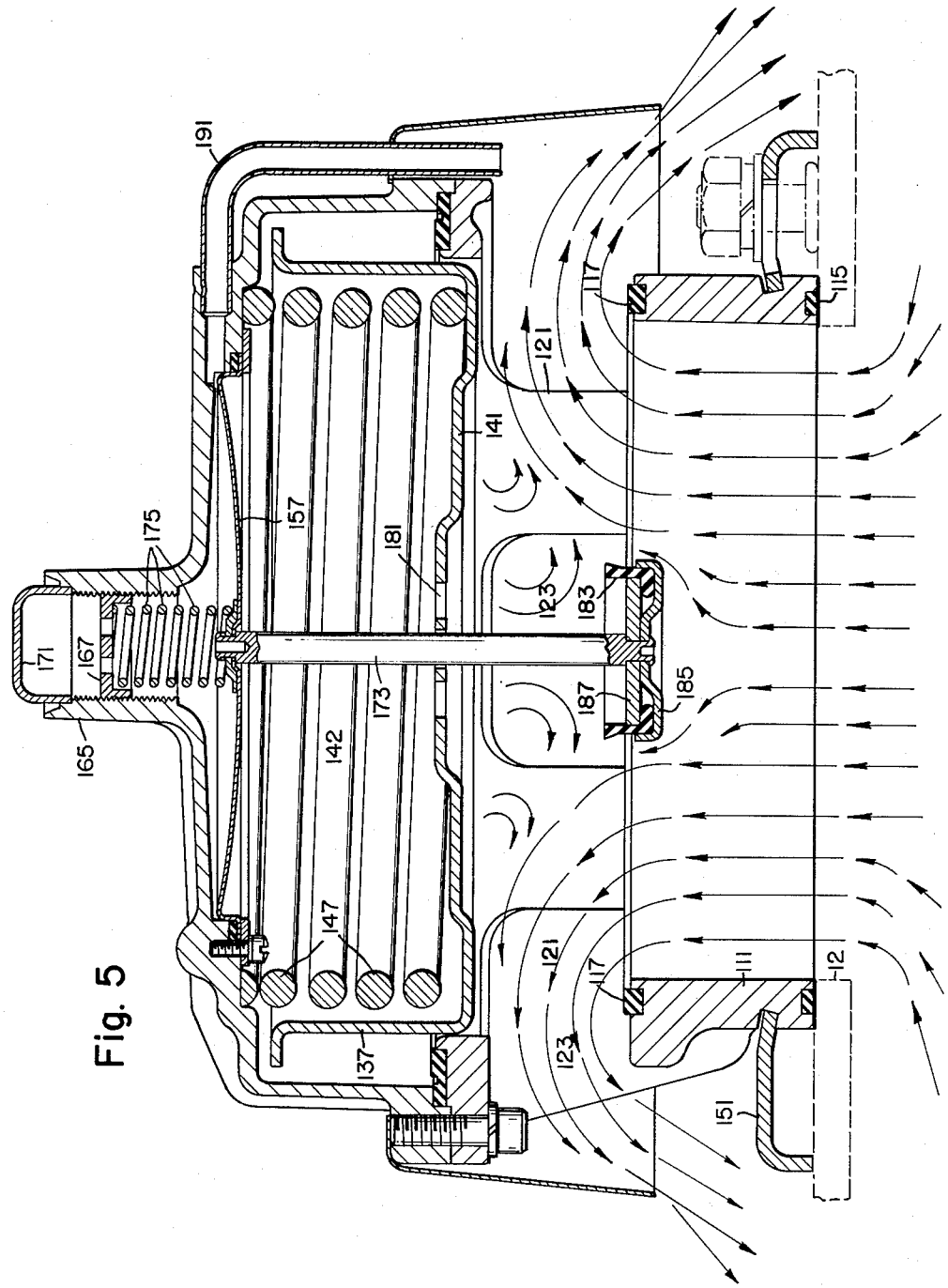
FIG. 5 is a view similar to FIG. 3 showing the valve in its open position relieving the pressure.

In the modification of FIGS. 3, 4, and 5, elements substantially the same as or corresponding to the various elements in the preferred embodiment of FIGS. 1 and 2, are given corresponding numerals, but increased by 100. Further description of these elements is considered to be unnecessary in most cases. The lower housing 111 is secured in this form of the invention to the top of the transformer tank by means of clamp plates 151 having outer downwardly extending flanges. The clamp plates 151 are spaced circumferentially about the lower end of the housing 111 which, in this case, is devoid of the flanges 13 used in the first embodiment. To secure the clamp plates 151 to the transformer tank, an appropriate fastening means for each of them is provided such as a bolt 153 secured to the tank and extending upwardly to an aperture in the clamp plate 151 and to the upper end of which is secured a nut 155 and washers which are tightened down to bear upon the clamp plate.

Secured to the under surface of the top 149 of the upper housing or cap 129 is a flexible metallic diaphragm 157. The diaphragm 157 is mounted such that its central portions, which are convex downwardly, are free to move from a lower position shown in FIG. 3 to an upper position shown in FIG. 4. For mounting the diaphragm, the central portion of the top 149 is raised, providing a downwardly extending inner shoulder 159. The periphery of the diaphragm 157 is conveniently formed into a right angle including a downwardly extending leg and a laterally extending leg which fit against the shoulder 159, the laterally extending leg being secured to the top 149 by appropriate means such as a retainer ring 161 which clamps against a gasket to provide a pressure tight seal and is secured in place by appropriate means such as the fasteners 163.

The center of the top 149 of the cap 129 is provided with an aperture about which is secured an upwardly extending tube 165, conveniently integral with the top 149, as shown. A spring cup 167 is adjustably secured within the tube 165 for axial movement such as by mating threads on the interior of the tube 165 and the periphery of the cup 167. The cup 167 is provided with a plurality of spanner apertures 169 for facilitating insertion and adjustment of the cup. To protect the interior of the tube 165 from the elements, a cap 171 is preferably frictionally held in place on the upper end of the tube.

Mounted at the center of the diaphragm 157 is a downwardly extending rod 173. A spring 175 is mounted between the spring retainer cup 167 and a lower spring retainer plate 177 secured to the upper end of the rod 173 and bearing on the top of the diaphragm 157. The spring 175 urges the diaphragm 157 and the rod 173 to a normal downward position, the compressive force of the spring 175 being adjustable by varying the position of the spring retainer cup 167 within the tube 165.

The rod 173 extends downwardly through a central aperture 179 in the bottom 141 of the cup 137. A plurality of circumferentially spaced openings 181 are provided about the central aperture 179 for communicating the valve chamber 142 with the interior of the transformer tank. A sealing ring 183 is mounted on the lower end of the rod 173 and is movable from a position spaced from the bottom 141 outwardly of the apertures 181 to a position sealing against the bottom 141. The sealing ring 183 is conveniently clamped between a lower cup shaped mounting plate 185 and an upper disk 187 fixed to the lower end of the rod 173.

With a gradual increase of pressure within the valve, the pressure is transmitted through the apertures 181 to the bottom surface of the diaphragm 157 which flexes upwardly against the tension of the spring 175 when a predetermined pressure is reached, carrying with it the rod 173 and the sealing ring 183. In order that the diaphragm 157 may operate across a pressure differential, the space above the diaphragm 157 is desirably vented to the atmosphere. To this end, a bore 189 extends laterally through the side of the raised central portion of the top 139. A tube 191 is fixed in the end of the bore 189 and preferably extends downwardly substantially parallel to the side walls of the cap 129 to avoid admitting rain or the like to the valve. Additionally, a skirt 193 is preferably secured to the upper surface of the ears 133 of the cap 129 and extends downwardly about the bottom of the tube 191 and outwardly of the spaces or openings 123 between the support bars 121 of the lower housing 111.

In the operation of the modification of FIGS. 3, 4, and 5, the force of the spring 175 is calibrated to the desired pressure at which the valve is to open during a gradual increase of pressure. The spring 175 urges the flexible diaphragm 157 to its downward position shown in FIG. 3, and the rod 173 is also urged downwardly to carry the sealing ring 183 out of engagement with the bottom 141 of the cup 137. In this position of the diaphragm and sealing ring, the pressure of the transformer tank is transmitted to the interior of the valve through the openings 181.

When the calibrated maximum safe pressure has been reached, the diaphragm 157 flexes upwardly and snaps to its upper position, it being recalled that the space above the diaphragm is vented to the atmosphere carrying with it the rod 173 and the sealing ring 183, which seals against the bottom 141 as shown in FIG. 4. Because of the volume increase within the valve chamber 142, caused by the upward flexing of the diaphragm 157, a pressure differential is created across the bottom 141 of the cup 137, and the cup 137 is lifted axially against the force of the spring 147 to its open position, as shown in FIG. 5. The pressure within the tank is relieved by moving outwardly to the atmosphere through the openings 123 between the support bars 121 of the lower housing 111 as shown by the arrows. On being relieved of the excess pressure, the cup 137 is moved downwardly by the spring 147 to reseat on the gaskets 117 and 127.

With a sudden increase in pressure due to a fault or explosion in the transformer tank, the pressure of the tank is not transmitted instantly to the interior of the valve through the restricted apertures 181, as a result of which a pressure differential is created across the bottom 141 of the cup 137. In this case the cup 137 is moved axially to open position without movement of the diaphragm 157, the rod 173 and the sealing ring 183. The pressure is relieved by being transmitted through the openings 123 between the support bars 121, and the spring 147 thereafter urges the cup 137 back to its sealing position against the gaskets 117 and 127. The modified form of the device of FIGS. 3 to 5 has the same advantages as the preferred embodiments of FIGS. 1 and 2 in that it completely and automatically self recloses and reseals, it seals itself more firmly as pressure within the tank increases, and it opens instantly not waiting for the required slow-rise value to be reached when a sudden pressure rise occurs. This valve, like the valve in FIGS. 1 and 2, opens to relieve the pressure within ¼ of a cycle of 60-cycle current; that is, within 1/240 of a second after the arc-over or other electrical failure.

Figure 6:
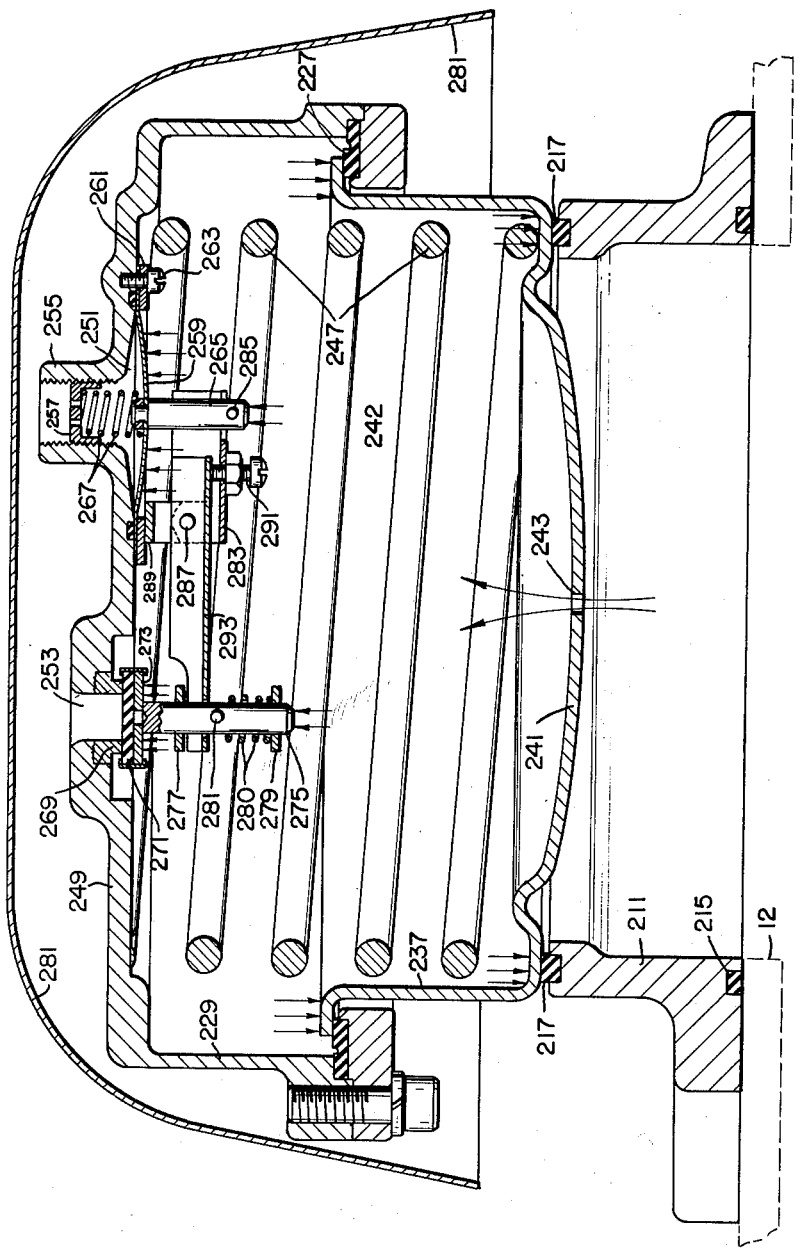
FIG. 6 is a cross sectional view of another modified form of the invention showing the valve in its closed position.

In the modification of FIG. 6, elements corresponding to elements heretofore described in the preferred embodiment of FIGS. 1 and 2 are given corresponding numerals, but increased by 200. Further description of those elements which are approximately the same is considered to be unnecessary. In this form of the invention, the cup 237 is movable from a closed position abutting the gaskets 217 and 227 to an open position against the force of the spring 247, pressure from the transformer tank being transmitted to the valve chamber 242 through the bleed port 243 in the bottom 241 of the cup 237.

The top 249 of the upper housing or cap 229 in this form has a pair of apertures 251 and 253. Extending upwardly above the aperture 251 is a short tube 255 within which is secured for longitudinal adjustment a spring retainer cup 257. A metallic flexible diaphragm 259 is secured to the inner surface of the top 249 below the aperture 251 and sealed by a gasket 260, and is arranged to flex between a downward normal position and a stressed upper position. Conveniently, the periphery of the diaphragm 259 is clamped between the top 249 and a retaining ring 261 which is preferably fastened to the top 249 by suitable fasteners such as the screws 263. Secured to a central portion of the diaphragm 259 is a downwardly extending rod 265. The diaphragm 259 and rod 265 are urged downwardly by a spring 267 which at its upper end abuts the spring retainer cup 257. The tension of the spring 267 is adjusted to a calibrated pressure by varying the position of the cup 257 in the tube 255. It is to be noted that as the pressure within the transformer tank increases gradually and is transmitted to the valve chamber 242 through the port 243, the diaphragm 259 flexes upwardly against the force of the spring 267 when the calibrated pressure is reached, thereby also carrying upwardly the rod 265.

Secured to the inner surface of the top 249 about the aperture 253 is an auxiliary valve including an inwardly extending collar 269 the lower annular edge of which constitutes a valve seat. A sealing disk 271 is arranged normally to abut the collar 269 to close the aperture 253 and to move axially away from the collar 269 to vent the pressure in the interior of the valve through the aperture 253. Conveniently, the sealing disk 271 is clamped to a mounting disk 273 from which extends downwardly a rod 275. The rod 275 is guided for substantially up and down movement by means of extending through vertically spaced plates 277 and 279 which are suspended from the top 249 in any convenient manner. The sealing disk 271 and the rod 275 are urged to an upper normal sealing position by a spring 280 abutting the lower guide plate and acting against a pin 281 extending laterally through the rod 275.

The rods 265 and 275 are connected together so that upward movement of the rod 265 resulting from flexing of the diaphragm 259 is transmitted to the rod 275 to cause a downward movement of this rod and the sealing disk 271. That is, the diaphragm 259 and the sealing disk 271 are operatively connected such that upward flexing of the diaphragm 259 at the calibrated pressure causes a downward movement of the sealing disk 271 so that the pressure within the valve is vented to the atmosphere through the aperture 253 to bring the pressure within the valve down to atmospheric pressure. To this end, a first channel 283 is provided having its bottom wall at one end slotted and fiitting around the rod 265 and resting on a pin 285 extending laterally through the rod 265. The other end of the first channel 283 is pivoted to a transversely extending pivot rod 287 appropriately suspended from the top 249 as by means of a bracket 289 secured to the retaining ring 261 as shown. Midway of its length, a stud 291 is secured to the bottom wall of the first channel 283 and extends upwardly by an amount which may be adjusted. A second channel 293 is pivoted intermediate its length on the pivot rod 287 and has one end positioned so that the end of the bottom wall of this channel abuts the top of the stud 291. The other end of the channel 293 is provided with an aperture in its bottom wall through which extends the rod 275, this end of the channel resting on the laterally extending pin 281. With this arrangement, it can be seen that upward movement of the rod 265 when the diaphragm 259 flexes carries with it the end of the first channel 283 and the stud 291. The second channel 293 is rotated clockwise about the pivot rod 287 to urge the rod 275 downwardly, thus carrying the sealing disk 271 away from the collar 269.

In the operation of the modified form of FIG. 6, a gradually increasing pressure of relatively low value within the transformer tank is bled through the bleed port 243 in the cup 237 to the interior of the valve. When the calibrated maximum safe pressure is reached, the diaphragm 259 flexes upwardly against the force of the spring 267, carrying with it the rod 265. By the connection including the channels 283 and 293 heretofore explained, the end of the channel 283 abutting the rod 265 is carried upwardly and the end of the channel 293 operatively connected to the rod 275 is carried downwardly. As the rod 275 is urged downwardly against the force of the spring, the sealing disk 271 moves off of the collar 269. The excess pressure within the valve escapes through the aperture 253 until the pressure in the chamber 242 has fallen enough to create sufficient pressure differential above and below the member 241 to move the cup 237 axially off of the gaskets 217 and 227 to its open position. The excess pressure in the transformer tank escapes through the spacings between the support bars of the lower housing 211, which is identical in structure to the lower housing 11 described in the preferred embodiment of FIGS. 1 and 2. After the pressure has been relieved, the cup 237 reseals automatically under the force of the spring 247, and of course the diaphragm 259 moves down to its normal position, closing the valve 271.

In the case of a sudden increase in pressure within the tank, too fast to permit the pressure in the chamber 242 to keep pace with the pressure in the tank, there will be a pressure differential across the bottom of the cup and the cup 237 is urged upwardly to its open position to relieve the pressure. As with the previously described modifications, the relief of pressure takes place within one quarter of a cycle.

As with the valves previously described, the valve according to the modification of FIG. 6 has the advantages that it completely or automatically self recloses and reseals, seals itself more tightly as pressure within the tank increases, and blows or opens instantly without waiting for the calibrated pressure to be reached on a sudden pressure rise or fault.

Figure 7:
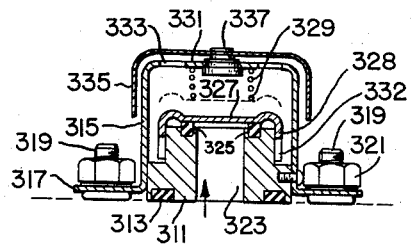
FIG. 7 is a cross sectional view of still another modified form of the invention, the valve being shown in full lines in its closed position and in dotted lines in its open position.

In the modified form of FIG. 7, a pressure relief valve is provided for use on smaller tanks or under conditions where the pressures do not rise as high as those for which the valves according to the other forms are used. This valve includes a tubular housing 311 having a diametrically larger lower end, in the bottom surface of which is embedded a gasket 313. An upper housing or cap 315 is appropriately fastened to the diametrically enlarged portion of the housing 311 and has a laterally extending flange 317 which is secured to the surface of the transformer tank. For instance, a plurality of circumferentially spaced bolts 319 may be secured to the tank extending upwardly through the flange 317, and a nut 321 may be tightened down on each bolt 319 to clamp the flange 317 securely in place. A centrally located bore 323 extends through the housing 311 and a gasket 325 is embedded in the upper edge of the housing 311 surrounding the bore 323. Normally covering the upper end of the bore 323 is a valve cup 327. The edges of the valve cup 327 are curved upwardly and thereafter downwardly so as to provide side walls 328 which slidably engage the outer surface of the reduced upper end of the housing 311 at all times during the upward and downward movements of the cup, to hold it in proper alinement with the stationary member 311.

The valve cup 327 is urged downwardly into sealing engagement with the gasket 325 by means of a spring 329 which abuts at its upper end the top 331 of the cap 315. The force of the spring 329 is calibrated such that at a predetermined pressure, the valve cup 327 is lifted off of the gasket 325, until the upper edges of notches 332 in the side walls 328 rise above the top shoulder or edge of the member 311, whereupon the pressure can escape laterally through these notches 332 and into the cap 315. When the valve cup 327 is in its fully closed position, the upper edges of the notches 332 are a little below the top of the member 311. Therefore, as soon as the valve begins to open, it completes its opening movement very quickly, because the pressure immediately begins to act on an increased area of the valve member, in much the same manner as occurs with the valve 61 in FIGS. 1 and 2. A plurality of apertures 333 are provided in the top 331 to vent the escaping gasses and vapors to the atmosphere. Preferably, a cover or umbrella 335 extends over the top 331 and downwardly along the side wall of the cap 315 to prevent rain or the like from entering the valve through the apertures 333. This umbrella 335 is desirably mounted on the top 331 in spaced relation thereto by a centrally located stud 337.

In the operation of the modification according to FIG. 7, pressure from the tank is communicated to the bottom surface of the valve cup 327 through the bore 323. At the predetermined calibrated pressure, the valve cup 327 is lifted off of the gasket 325 to release the pressure escaping through the notches 332 and thence through the apertures 333 to the surrounding atmosphere. It is to be noted that initially the pressure acts on the valve plate 327 only to the extent of the area within the gasket 325, but when the valve plate has lifted slightly off the gasket 325, the pressure now acts on the entire area of the valve cup. Of course, the valve cup 327 automatically reseals when the pressure has been relieved under the force of the spring 329. On a gradual increase in pressure or on a sudden increase in pressure to a relatively high value due to a fault or explosion, the valve cup 327 is lifted within one fourth of a cycle as was the case with the valves according to the other modifications.

The parts of all valve members which engage with or break away from gaskets are preferably coated with "Teflon" to prevent possible sticking if the valve does not have occasion to open for a long period of time. Thus the outer surfaces of the valve cups 41, 141, and 241, the bottom and outer lateral surfaces of the valve member 61, the bottom sealing face of the member 261, and the bottom and inner lateral faces of the member 327 all have the coating of "Teflon."

As has been emphasized, the pressure relief valve according to the present invention operates almost instantly to relieve the excess pressure and reseats and reseals itself automatically after operating. The valve operates a great many times without requiring maintenance crews to investigate its performance or to replace parts and reset mechanisms. The desirability of functioning rapidly is evident in order to eliminate the possibility of damage to the tank or subsequent leakage of oil, danger of fire, and leakage of water or moisture-laden air to the tank. It is doubly essential that the valve be self reclosing and self resealing to prevent the entrance of water and moisture-laden air into the transformer once the device has operated. Water or moisture within the transformer tank would lower the dielectric strength of the oil and also cause rusting inside the tank which might eventually lead to electrical breakdowns. If the transformer user is aware that moisture has been taken into the tank, the situation may be remedied by filtering the oil and drying out the core and core unit, but this would involve considerable expense which can be averted by the use of a resealing relief valve which operates instantly. The resealing mechanism within the valve is long lived and is foolproof. There is furthermore no mechanism within the transformer tank itself to pose restrictions to the exit gasses and vapors. Parts in the preferred embodiment and the other modifications which are movable are relatively light weight. This means that the valves can be made small and compact and extremely rugged without wasting a great deal of space.

The speed of opening of the valve, it is repeated, is of utmost importance. On a slow pressure rise the valve opens at exactly the prescribed pressure, as set by the manufacturer and owner of the transformer tank, and opens entirely within one-fourth of a cycle to bleed all gasses and vapors from the tank. Let us assume, for example, that the valve has been calibrated and set to open at 10 p.s.i on a gradual pressure rise. On a sudden pressure rise or serious fault or explosion, the valve is designed to open within one-fourth of a cycle at pressures which, under certain conditions, may be less than 10 p.s.i. For example, assume that the transformer was operating at pressure of 2 p.s.i when a serious fault or arcing within the transformer occurs, building up the pressure to 50 or even 150 p.s.i. very rapidly if not immediately vented. The force of the springs urging the cups 37, 137 and 237 to closed position in the embodiments of FIG. 1, FIG. 3 and FIG. 6, respectively, that is, the force of the springs 47, 147, and 247, respectively may be chosen to yield when the pressure has increased suddenly two pounds above what the pressure was at the time of the fault or explosion. For example, if the gradually increasing pressure has a value of 2 p.s.i. when a fault or explosion occurs, the valve opens to relieve this excess pressure when the pressure has increased by 2 p.s.i to a total of 4 p.s.i. Thus, it is not necessary for the gradually increasing pressure within the valve to reach the calibrated pressure of 10 p.s.i. before the valve opens when a sudden fault or explosion occurs. The valve opens instantly to its full travel within one-fourth of a cycle and completely relieves the gas built up and vapors within the transformer tank. After the valve has operated, it closes and completely reseals itself automatically, ready to safeguard the tank on its next demand.

The valves according to the modifications of FIG. 1, FIG. 3, and FIG. 6, do not have a natural tendency to leak when the pressure is gradually increasing. Rather, on the other hand, the valve seals much more tightly as the pressure increases slowly, and continues to seal more tightly until the calibrated relief pressure is reached, at which time it operates to relieve the pressure instantly.

It is seen from the foregoing disclosure that the mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A pressure relief valve for relief of gas fluid pressure slowly rising to a first predetermined value and for relief of gas fluid pressure rapidly rising to a second predetermined value substantially lower than said first predetermined value, said relief valve comprising a tubular valve body having a substantially greater internal diameter than its axial length and an inlet orifice of large area at a first end and having a lateral escape orifice of large area throughout the major part of the circumference of said tubular body intermediate said first end and a second end, a first valve seat in surrounding relation to said inlet orifice and located between said escape orifice and the first end of said tubular body, a second valve seat surrounding a larger area than said first valve seat and located in sealed relation to side walls of said tubular valve body in a position between said escape orifice and said second end of said valve body, a relatively light low-inertia cup-shaped movable valve member of sheet metal of uniform thickness having a bottom wall normally resting upon and making sealing contact with said first valve seat and having a side wall rising axially from said bottom wall and having an outwardly extending marginal flange extending from said side wall into normally sealing contact with said second valve seat, a restricted bleed port extending through said bottom wall of said valve member, said valve member when in its normal sealing position serving to subdivide the space within said tubular valve body into a first portion communicating freely with said inlet orifice and sealed to the outside atmosphere and a second portion constituting a chamber sealed from said first portion except through said bleed port, so that during slow rise of fluid pressure at said inlet orifice, pressure within said chamber will rise correspondingly and will act on said valve member at the diameter of said second valve seat to tend to keep said valve member in closed and sealed position, a light spring also tending to hold said valve member in closed and sealed position, said valve member being relatively thin and light so as to have relatively low inertia so that a rapid rise in pressure at said inlet orifice can readily move said valve member away from said first and second valve seats to enable escape of pressure through said escape orifice, and means for lowering pressure in said chamber upon slow rise thereof to a predetermined value, to create a pressure differential on opposite sides of said valve member so that such pressure differential may move said valve member away from said first and second valve seats, the construction further including a first resilient gasket at said first valve seat and a second resilient gasket at said second valve seat, and said cup-shaped valve member being of such size that upon movement of said valve member in an opening direction against the force of said spring, the seal between said valve member and said second gasket will crack open before the seal between said valve member and said first gasket opens, thus allowing fast escape of gas pressure from said second portion of the space within said valve body through a large escape area around the circumference of said second valve seat, thereby quickly lowering the pressure within said second portion of said space and accelerating the movement of said valve member to fully open position.

2. For use with an electric transformer tank adapted to contain a supply of insulating oil and electrical equipment immersed in the oil and liable to create therein a short circuit causing generation of a large volume of gas, having means forming an opening of large area in the top of said transformer tank above the upper surface of the oil therein, and quick-acting gas pressure relief means for rapidly relieving gas pressure built up within said tank by such short circuit, said relief means comprising:

(a) a ring shaped housing adapted to rest on the top of said transformer tank in surrounding relation to said opening therein, (b) an annular groove in the bottom surface of said housing, (c) a first sealing gasket tightly seated in said groove and adapted to tightly engage the top surface of said transformer tank, to effect gas-tight sealing between said housing and said tank, said gasket lying approximately in a horizontal plane, (d) a second sealing gasket of annular form carried by said housing at an elevation spaced upwardly from said first sealing gasket, said second gasket having a top surface lying substantially in a horizontal plane, (e) said housing being substantially gas-tight laterally throughout the portion of its height between the first gasket and the second gasket, (f) a third sealing gasket of annular form carried by said housing at an elevation spaced upwardly from said second sealing gasket, said third gasket being of larger internal diameter and of greater radial width than said second gasket and having throughout at least a part of its said radial width a top surface lying substantially in a horizontal plane, (g) said housing being laterally vented by gas pressure relieving openings of relatively large size occupying the major part of the periphery of the housing in the portion of its height between the second gasket and the third gasket, (h) a generally dome-shaped cap member having an annular edge resting upon the outer portion of the radial width of said third gasket and tightly sealed thereto, (i) a light sheet metal cup member of substantially uniform thickness throughout all its parts, said cup member having a bottom wall portion normally tightly seated on the horizontal top surface of said second gasket and extending across the area encircled by said second gasket and having a substantially cylindrical side wall portion extending substantially vertically upwardly from the outer marginal edges of said bottom wall portion and having an outwardly extending annular marginal flange extending substantially horizontally outwardly from the upper end of said cylindrical side wall portion, said flange being normally tightly seated on the inner part of the radial width of said third gasket when the bottom wall portion of the cup member is seated on the second gasket, (j) a coil spring mounted with its axis substantially vertical and having an upper end pressing upwardly on the inner surface of the top of said dome-shaped cap member and a lower end pressing downwardly on said bottom wall portion of said sheet metal cup member to tend to keep said bottom wall portion and said annular marginal flange, respectively, seated on said second gasket and said third gasket, respectively, in sealing relation thereto, (k) the parts being so arranged that a sudden increase of pressure will act against said bottom wall portion of said sheet metal cup member to raise said cup member against the force of said spring so that the pressure may flow upwardly and outwardly between said second gasket and said cup member and thence laterally outwardly through the venting openings of said housing, (l) slow bleed means for allowing pressure from within said tank to enter the space between said cap member and said sheet metal cup member, and (m) means for lowering pressure within the space between said cap member and said sheet metal cup member when such pressure reaches a predetermined magnitude, thereby creating a pressure differential on opposite sides of said sheet metal cup member so that said pressure differential may rise said cup member against the force of said spring, (n) the vertical distance between said marginal flange on said cup member and the bottom wall thereof being so related to the vertical distance between said second gasket and said third gasket, that when said cup member starts to move upwardly against the force of said coil spring, the seal between said marginal flange and said third gasket will crack open before the seal between said bottom wall and said second gasket opens, thus allowing fast escape of gas pressure from the space between said cap member and said cup member all around the periphery of said marginal flange, thereby quickly lowering the pressure within said space and accelerating the upward movement of said cup member to fully open position.

3. For use with an electric transformer tank adapted to contain a supply of insulating oil and electrical equipment immersed in the oil and liable to create therein a short circuit causing generation of a large volume of gas, having means forming an opening of large area in the top of said transformer tank above the upper surface of the oil therein, and quick-acting gas pressure relief means for rapidly relieving gas pressure built up within said tank by such short circuit, said relief means comprising:

(a) a ring shaped housing adapted to rest on the top of said transformer tank in surrounding relation to said opening therein, (b) an annular groove in the bottom surface of said housing, (c) a first sealing gasket tightly seated in said groove and adapted to tightly engage the top surface of said transformer tank, to effect gas-tight sealing between said housing and said tank, said gasket lying approximately in a horizontal plane, (d) a second sealing gasket of annular form carried by said housing at an elevation spaced upwardly from said first sealing gasket, said second gasket having a top surface lying substantially in a horizontal plane, (e) said housing being substantially gas-tight laterally throughout the portion of its height between the first gasket and the second gasket, (f) a third sealing gasket of annular form carried by said housing at an elevation spaced upwardly from said second sealing gasket, said third gasket being of larger internal diameter and of greater radial width than said second gasket and having throughout at least a part of its said radial width a top surface lying substantially in a horizontal plane, (g) said housing being laterally vented by gas pressure relieving openings of relatively large size occupying the major part of the periphery of the housing in the portion of its height between the second gasket and the third gasket, (h) a generally dome-shaped cap member having an annular edge resting upon the outer portion of the radial width of said third gasket and tightly sealed thereto, (i) a light sheet metal cup member of substantially uniform thickness throughout all its parts, said cup member having a bottom wall portion normally tightly seated on the horizontal top surface of said second gasket and extending across the area encircled by said second gasket and having a substantially cylindrical side wall portion extending substantially vertically upwardly from the outer marginal edges of said bottom wall portion and having an outwardly extending annular marginal flange extending substantially horizontally outwardly from the upper end of said cylindrical side wall portion, said flange being normally tightly seated on the inner part of the radial width of said third gasket when the bottom wall portion of the cup members is seated on the second gasket, (j) a coil spring mounted with its axis substantially vertical and having an upper end pressing upwardly on the inner surface of the top of said dome-shaped cap member and a lower end pressing downwardly on said bottom wall portion of said sheet metal cup member to tend to keep said bottom wall portion and said annular marginal flange, respectively, seated on said second gasket and said third gasket, respectively, in sealing relation thereto, (k) the parts being so arranged that a sudden increase of pressure will act against said bottom wall portion of said sheet metal cup member to raise said cup member against the force of said spring so that the pressure may flow upwardly and outwardly between said second gasket and said cup member and thence laterally outwardly through the venting openings of said housing, (l) slow bleed means for allowing pressure from within said tank to enter the space between said cap member and said sheet metal cup member, (m) means for lowering pressure within the space between said cap member and said sheet metal cup member when such pressure reaches a predetermined magnitude, thereby creating a pressure differential on opposite sides of said sheet metal cup member so that said pressure differential may raise said cup member against the force of said spring, (n) a cover member surmounting said dome-shaped cap member and having a marginal skirt portion surrounding and spaced outwardly from the sides of said dome-shaped cap member and the cylindrical side wall portion of said sheet metal cup member, (o) a signal flag member pivotally mounted on said cover member and spring biased for movement from an ineffective inconspicuous position to an effective upstanding conspicuous position, (p) a releasable latch for holding said flag member in its said ineffective position, (q) a latch spring tending to move said latch from a latching position to a release position, and (r) cooperating parts on said latch and said sheet metal cup member for holding said latch in latching position against the force of said latch spring while said sheet metal cup member is seated in sealed relation to said second and third gaskets, the parts being so arranged that upon upward movement of said sheet metal cup member, said latch spring may move said latch to release position, thereby releasing said signal flag member for movement to its said effective position.

4. Quick acting gas pressure relief means for relieving gas pressure generated rapidly in an electric transformer tank upon occurrence of an electric short circuit within a body of oil contained in said tank, said pressure relief means comprising:

(a) an upstanding housing adapted to rest upon and be tightly sealed to a top wall of a transformer tank in surrounding relation to a discharge opening in said top wall, (b) two sealing gaskets of annular form mounted on said housing at materially different elevations thereon, (c) said housing being substantially gas-tight laterally throughout the portion of its height below the lower one of said two gaskets and being laterally vented by pressure relieving openings of relatively large size through the portion of its height between said two gaskets, (d) a generally dome-shaped cap member stationarily resting on and sealed to a portion of the upper one of said two gaskets, (e) a stationary cover member secured to and extending across the top of said cap member and having a depending marginal flange in surrounding and laterally spaced relation to said cap member and the upper part of said housing, (f) a light sheet metal cup member having a bottom wall portion normally tightly seated on the lower one of said two gaskets and a cylindrical side wall portion extending from said bottom wall portion upwardly to the elevation of the upper one of said two gaskets and an outwardly extending top flange portion normally tightly seated on the upper one of said two gaskets, the top of said sheet metal cup member being normally spaced downwardly from said dome-shaped cap member to allow room for said cup member to rise relatively to the stationary cap member, (g) a coil spring between said dome-shaped cap member and said sheet metal cup member for resiliently pressing downwardly on said cup member to tend to keep it seated on both of said gaskets until forced upwardly by sufficient difference in pressure on opposite faces of said bottom wall portion of said cup member to overcome the downward force of said coil spring, (h) means for lowering pressure in the space between said cap member and said cup member so as to increase said difference in pressure on opposite faces of said cup member so that gas pressure may force said cup member upwardly to unseat it from both of said gaskets and to escape laterally through said pressure relieving openings in said housing, (i) a signalling member pivotally mounted on said cover member near the top thereof and movable from an ineffective position to an effective position, said signalling member in its ineffective position extending downwardly from its pivotal mounting to a point near the bottom edge of the marginal flange of said cover member, (j) a biasing spring tending to move said signalling member from its ineffective position toward its effective position, (k) a latch pivotally mounted on said housing and movable between a latching position and a release position, said latch in its latching position engaging said signalling member to hold said signalling member in its ineffective position against the force of said biasing spring, (l) a latch spring tending to move said latch from latching position to release position, and (m) a contacting portion on said latch for engaging a portion of the cylindrical side wall of said sheet metal cup member to hold said latch in latching position against the force of said latch spring, when said sheet metal cup member is in normal position seated on both of said gaskets, (n) the parts being so arranged and related to each other that when gas pressure forces said sheet metal cup member upwardly to unseat it from said gaskets, said member no longer holds said latch in latching position, said latch spring moves said latch to release position, and said biasing spring then moves said signalling member to its effective position.

References Cited in the file of this patent
UNITED STATES PATENTS

| | | |
|---|---|---|
| 314,649 | Campbell | Mar. 31, 1885 |
| 1,660,382 | Hopkins | Feb. 28, 1928 |
| 1,846,483 | Gilbert | Feb. 23, 1932 |
| 2,196,247 | Browne et al. | Apr. 9, 1940 |
| 2,211,237 | Langdon | Aug. 13, 1940 |
| 2,224,394 | Jurs | Dec. 10, 1940 |
| 2,622,613 | McNeal | Dec. 23, 1952 |
| 2,839,076 | Mueller | June 17, 1958 |
| 2,882,922 | Schindel | Apr. 21, 1959 |